(12) United States Patent
Gujar et al.

(10) Patent No.: US 6,446,208 B1
(45) Date of Patent: *Sep. 3, 2002

(54) USER INTERFACE SYSTEM BASED ON SEQUENTIALLY READ ELECTRONIC TAGS

(75) Inventors: Anuj Uday Gujar, Palo Alto; Kenneth P. Fishkin, Redwood City; Beverly L. Harrison, Palo Alto; Roy Want, Los Altos, all of CA (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/151,164

(22) Filed: Sep. 10, 1998

(51) Int. Cl.$^7$ .............................................. H04K 1/00
(52) U.S. Cl. ...................................... 713/185; 713/184
(58) Field of Search .................................. 713/184, 185

(56) References Cited

U.S. PATENT DOCUMENTS

| | | | |
|---|---|---|---|
| 5,572,195 A | 11/1996 | Heller et al. | 340/825.35 |
| 5,689,238 A | 11/1997 | Cannon, Jr. et al. | 340/568 |
| 5,763,862 A * | 6/1998 | Jachimowicz et al. | 235/380 |

FOREIGN PATENT DOCUMENTS

GB 2313 520 A 11/1997

OTHER PUBLICATIONS

Simmons, Contemporary Cryptology, The Science of Information Integrity, IEEE Press, 1992.*
Schneier, Applied Cryptology, 2 e, John Wiley & Sons, Inc, Oct. 1995.*
Spencer, Harvey. "Non–Contact Imaging Tracks Incoming Cartons, Crowds–and Cattle!" *ADVANCED IMAGING*, Solutions for the Electronic Imaging Professional, Apr. 1998, pp. 10 & 12.

* cited by examiner

*Primary Examiner*—Gail Hayes
*Assistant Examiner*—James Seal
(74) *Attorney, Agent, or Firm*—Robert Burtzlaff; Nola Mae McBain

(57) ABSTRACT

A system for identifying multiple electronic tags that includes a plurality of electronic tags attachable to a single object, each electronic tag having a non-overlapping readable region, and each electronic tag having a unique identifier. One or more electronic tag readers are configured to read the unique identifier of each electronic tag within the non-overlapping readable region, and a computing system is connected to the electronic tag reader to provide digital services in response to reading the unique identifier of each electronic tag. In certain embodiments, the electronic tags can have integral sensor systems that detect, for example, light, location, acceleration, or other physical properties, allowing provision of particular digital services related to the sensed properties.

18 Claims, 10 Drawing Sheets

USER INTERFACE SYSTEM BASED ON SEQUENTIALLY READ ELECTRONIC TAGS

FIELD OF THE INVENTION

The present invention relates to a system for transferring electronic information using multiple electronic tags. More particularly, the present invention relates to object attachable radiofrequency electronic tags and tag readers connected to a computer network.

BACKGROUND

Tagging items with barcodes or symbols that facilitate optical character recognition has long been used to identify and track product inventories, baggage, paper checks, or other movable items susceptible to misplacement or loss. Unfortunately, such optically perceptible tags must remain visible for identification, and can be easily rendered unreadable by surface marks or other damage.

To improve tracking reliability, attempts have been made to use radiofrequency based electronic tags. Such tags typically have a semiconductor memory for data storage, processing logic, and a small antenna for broadcasting data, all embedded in rugged epoxy, thermoplastic, or other suitable plastic containers. Data storage capacity typically ranges from a few bits to many kilobits, with 64 bits being typical. Tags can include read only memory (ROM), electrically programmable or erasable (EPROM and EEPROM), or even flash memory. An electronic tag can be powered by a long lasting small battery, photovoltaic power, thermal convertor, inductive power converter that relies on externally applied electromagnetic energy, or any other suitable power supply.

Unfortunately, since such electronic tags broadcast information when powered, use of large numbers of electronic tags in close physical proximity is difficult. For example, if multiple electronic tags are situated within a few centimeters of each other, their overlapping data broadcasts could interfere with each other, making it difficult to determine tag identity. Such problems have generally limited electronic tag placement by requiring only one tag per object, with each object being well separated from each other during data transfer. This requirement has limited use of electronic tags in an office environment, where large numbers of tags could be profitably used for tracking papers, files, or other printed material.

SUMMARY OF THE INVENTION

In the modern office environment, the management of paper documents is not well coordinated with the management of their electronic counterparts. If an electronic tag is attached to a physical document, a user can access some associated virtual representation (e.g. an ASCII text file) by placing it near an augmented computer equipped with a tag reader. The resulting system is a powerful tool for maintaining a bridge between physical and virtual representations of documents, or, in general, for augmenting physical objects with virtual associations. Advantageously, the present system can be used to track multiple tagged documents in close proximity, or to allow performance of various selected services (e.g. printing, e-mailing, discarding electronic copies, opening electronic applications)

The present invention meets these requirements by providing a system for identifying multiple electronic tags that includes a plurality of electronic tags attachable to a single object, each electronic tag having a non-overlapping readable region, and each electronic tag having a unique identifier. One or more electronic tag readers are configured to read the unique identifier of each electronic tag within the non-overlapping readable region, and a computing system is connected to the electronic tag reader to provide digital services in response to reading the unique identifier of each electronic tag. In certain embodiments, the electronic tags can have integral sensor systems that detect, for example, light, location, acceleration, or other physical properties, allowing provision of particular digital services related to the sensed properties.

Such a system is particularly useful for multiple tagging of substantially three-dimensional objects (solids) or two-dimensional objects (sheets) with large numbers of distinct electronic tags. For example, a multifaced solid such as a polyhedron can have each face, edge, or vertex equipped with a unique electronic tag that invokes a digital service (or provides parameters for enabled digital services). Various symbolic indicia such as text, graphics (pictures or line drawings), color codings, texture codings, etc. can be used to assist a user in associating a particular tag with a digital service.

The foregoing electronic tags can be read by tag readers attached to desktop computers, or in certain embodiments, by tag readers integral or closely attached to portable or hand holdable computers. Such portable computers can also support wireless network transceivers for communication with a computer network, extending the range of supported digital services.

In operation, at least one electronic identification tag is affixed to each physical item that is associated with digital services. These tags can be small radio frequency transponders comprised of an integrated circuit, containing a unique user accessible 39-bit identification number. A small coil inductively powers the tag, and an antenna is used to broadcast the identification number. In certain embodiments, the antenna can be separate from the power coil, or alternatively, a dual-use inductive power coil/antenna coil can be used.

A tag reader that includes transmitter and receiver components is affixed to a computational device such as a hand held computer. The tag reader transmits a pulse that momentarily energizes the tag through its coil until it has sufficient power for transient transmission of its identification number. The communication between tag and tag reader only occurs when both are proximate, with an actual distance varying based on size of the antenna attached to the tag and to the transmitter, from a distance of a few inches to that of several feet. Once the identification number (transmitted serially) is received, the tag reader passes this on to the computer system as an ASCII string, via a serial RS-232 output or some other suitable connection, while simultaneously providing user feedback to confirm reading of the tag. User feedback can be visual (e.g. blinking indicator light, LED status light, text or iconic are several presentations), auditory (e.g. an audible buzz or beep), tactile (e.g. a button being raised or a perceptible structure rotation), or combinations of the foregoing.

Upon receipt of the identification number, a computer based application program interprets the identification input string, determines the current application context, and provides appropriate digital services. For example, an ASCII database that maps identification numbers to one or more digital services can be used. One common action is a {program, identification number} pair that invokes the identified program on the associated identification number. If the received identification number has not been previously registered, i.e. associated with an action in the ASCII database, the user can be prompted to enter an action(s) and any associated parameters via a dialog box. Network and server connectivity is provided by a separate wireless radiofrequency or infrared networking system. If the program or the file to be retrieved reside on the network, filenames that are independent of the particular sensing computer can be used.

In addition to an identification number, certain embodiments of tags in accordance with the present invention can convey small amounts of modifiable data (maintained, e.g., in flash memory). For example, data provided by sensors embedded or attached to the tag can be used to detect folding, twisting, or bending of the tagged object. Alternatively, a number of accelerometers that sense relative spatial information; gyroscopic, radio or infrared positional sensors for determining absolute position; and various thermal or photosensors that respectively detect temperature and light level changes can provide sensed data values for later transmission by the tag. Intentional or unintentional modifications detected by one or more of these sensor systems, taken in conjunction with the particular tag presented to the tag reader, can provide the basis for a powerful user interface scheme.

As those skilled in the art will appreciate, each identification number or sensed data value that is read (sensed) by the tag reader can be labeled as a "senseme", with a particular digital service or attribute being associated with each senseme. Although the wide variety of easily distinguishable sensemes (e.g. identification numbers) would alone provide a powerful user interface to a computer, the present invention further extends the flexibility of the senseme based user interface by supporting computer control based on a multiple senseme input, with temporally synchronous (or overlapping asynchronous) tuples of one or more sensemes (e.g. particular identification numbers and sensed states) being read by the tag reader. Single and multiple sensemes can in turn be extended by participation in a "sentence". A sentence is defined as a sequence of one or more temporally disjoint sensemes or senseme tuples. The sentence level allows definition of a input grammar by appropriate choice of senseme sequence, and corollary rules governing, for example, use of active verb-like sensemes (e.g. "print"), naming noun-like sensemes (e.g. DOC1.TXT), or connectors (e.g. AND).

In effect, the present invention provides a method for transferring information from a tagged object with optional sensors to a tag reader connected computer. The method comprises the steps of manipulating one or more tags and optional tag sensors to provide a first senseme input (that includes the tag identification number) to the computer, with the first senseme input normally triggering a first default action by the computer. The tagged object may also be manipulated to provide a second senseme input (again including a tag identification number) to the computer, with the second senseme input converting the normally triggered first default action to a second action. The first and second sensemes (and any subsequent sensemes) together form a sentence that can be interpreted as a command to implement a computer controlled action, whether it be to open and print a particular electronic document, unlock an electronically controlled door in response to a tag conveyed personal identification number, display a graphical image on a computer display, or begin logging on to a computer network. In operation, for example, the sentence "establish authorization, open a file, and print the file to printer number 3" can involve the sequential steps of reading a first tag embedded in a picture identification card to establish user identification, immediately presenting a second tag clipped to a paper document to specify a related electronic document and finally presenting a three dimensional token that appears like a small printer with an embedded third tag and pressure sensor that initiates printing of the previously specified document at printer number 3 after pressure sensors electrically connected to the tag are squeezed three times. The foregoing operation conveniently distinguishes particular electronic documents, and allows a user to select particular printers, (e.g. with printer 1 requiring one sensed squeeze and printer 2 requiring two sensed squeezes) without requiring visual displays or complex input commands.

Utility of the foregoing system can be extended by selective shielding of the electronic tag. Shielding can be used to arbitrarily limit the readable range or provide strong directional reading properties for the electronic tag, a particularly useful feature when large numbers of electronic tags are positioned near each other. According to the present invention, an electronic tag including a processor, a readable memory for holding an identification number connected to the processor, an antenna connected to the processor for radiofrequency broadcasting of the identification number, and a power supply for powering the antenna to broadcast the identification number is provided with an electromagnetic shield positioned near the antenna for reducing broadcasting range of the antenna. The shield can, for example, be metallic wire or sheeting positioned at least partially around or near the antenna, or metal lined cavities into which the electronic tag is attached. Such shields in accordance with the present invention reduce reading range and can limit reading of the tag to specific directions. For example, electronic tags can be partially surrounded with shields to limit readable electromagnetic radiation to a direction substantially normal to the surface of an object to which the tag is attached. Such shields would allow large numbers of electronic tags to be closely spaced on an object, since interfering lateral electromagnetic radiation from adjacent tags would be inhibited.

In certain embodiments, the electromagnetic shield is movable between a first substantially non-blocking position and a second blocking position that respectively unblocks and blocks antenna broadcast. The movable electromagnetic shield can be biased to remain in its first substantially non-blocking position to allow antenna broadcast, or alternatively biased to remain in its second blocking position to block antenna broadcast. Advantageously, a user movable shield also permits use of the electronic tag as a user defined communication channel for transmitting small amounts of information. If an electronic tag having a transmitted identification number is controllably shielding and deshielding to provide a user defined time series of readable and non-readable intervals for the transmitted identification number, the consequent user defined time series of readable and non-readable intervals for the transmitted identification number can be interpreted as bit-wise communication associatable with the transmitted identification number. In effect, a user could send bit codes by intermittently interrupting reading of the electronic tag (or alternatively, by intermittently allowing reading of the electronic tag). Such small amounts of user defined and transmitted information can be used to parameterize digital services associated with the transmitted identification number, or can even be used as personal identification numbers or verifiers to initiate triggering of a digital service in response to reading an electronic tag. For example, a tag reader can be configured to launch an application only after receipt of two pulses (clicks) of a particular identification number. Such a mechanism reduces inadvertent or unwanted triggering of a digital service ordinarily provided in response to reading an electronic tag.

In addition to selective shielding, the present invention provides for selective enablement and disablement of electronic tags. This is yet another mechanism that eases problems associated with use of large numbers of closely placed electronic tags, and also allows for some limited user defined communication. An electronic tag having a processor, a readable memory for holding an identification number connected to the processor, an antenna connected to the processor for radiofrequency broadcasting of the identification number, a power supply for powering the antenna to broadcast the identification number, is also provided with an interconnect switch for interconnecting at least two members selected from a set defined by the processor, readable memory, antenna, and power supply. The interconnect switch can be biased to remain normally open, preventing broadcast of the identification number, or alternatively, can be biased to remain normally closed, allowing broadcast of the identification number.

As will be appreciated, the interconnect switch can be connected between the antenna and one of the processor and the power supply, with opening or closure being controlled by a user that opens or closes electrical contacts in the interconnect switch (using any conventional button, contact switch, electrical switch, or other conventional switch known to those skilled in the art). In certain embodiments, a sensor can be connected to the processor, and the interconnect switch is alternately opened and closed in response to sensor data provided by the sensor. For example, an electronic tag can be equipped with an accelerometer capable of signaling when the tag is nudged or shaken. Normally, the tag remains disabled with its interconnect switch open. If the tag is moved, shaken, or nudged, the accelerometer senses the transient accelerations and sends a signal to the interconnect switch to close, allowing the electronic tag to broadcast its identification number. A second shaking reverses the foregoing, causing the sensor to signal the interconnect switch to open and break the antenna/power-supply connection (for example), disabling the electronic tag. Sensor systems responding to heat, light, sound, force, or any suitable effect can be employed in the present invention.

As noted previously in connection with movable shields, user defined enablement or disablement of the electronic tags can be used for low bit rate communications directed by a user. Controllably switching an interconnect switch of an electronic tag having a transmittable identification number provides a user defined time series of readable and non-readable intervals for the transmitted identification number. This user defined time series of readable and non-readable interval for the transmitted identification number can be readily interpreted as bit-wise communication associatable with the transmitted identification number.

Additional functions, objects, advantages, and features of the present invention will become apparent from consideration of the following description and drawings of preferred embodiments.

DETAILED DESCRIPTION OF THE DRAWINGS

Figure 1:
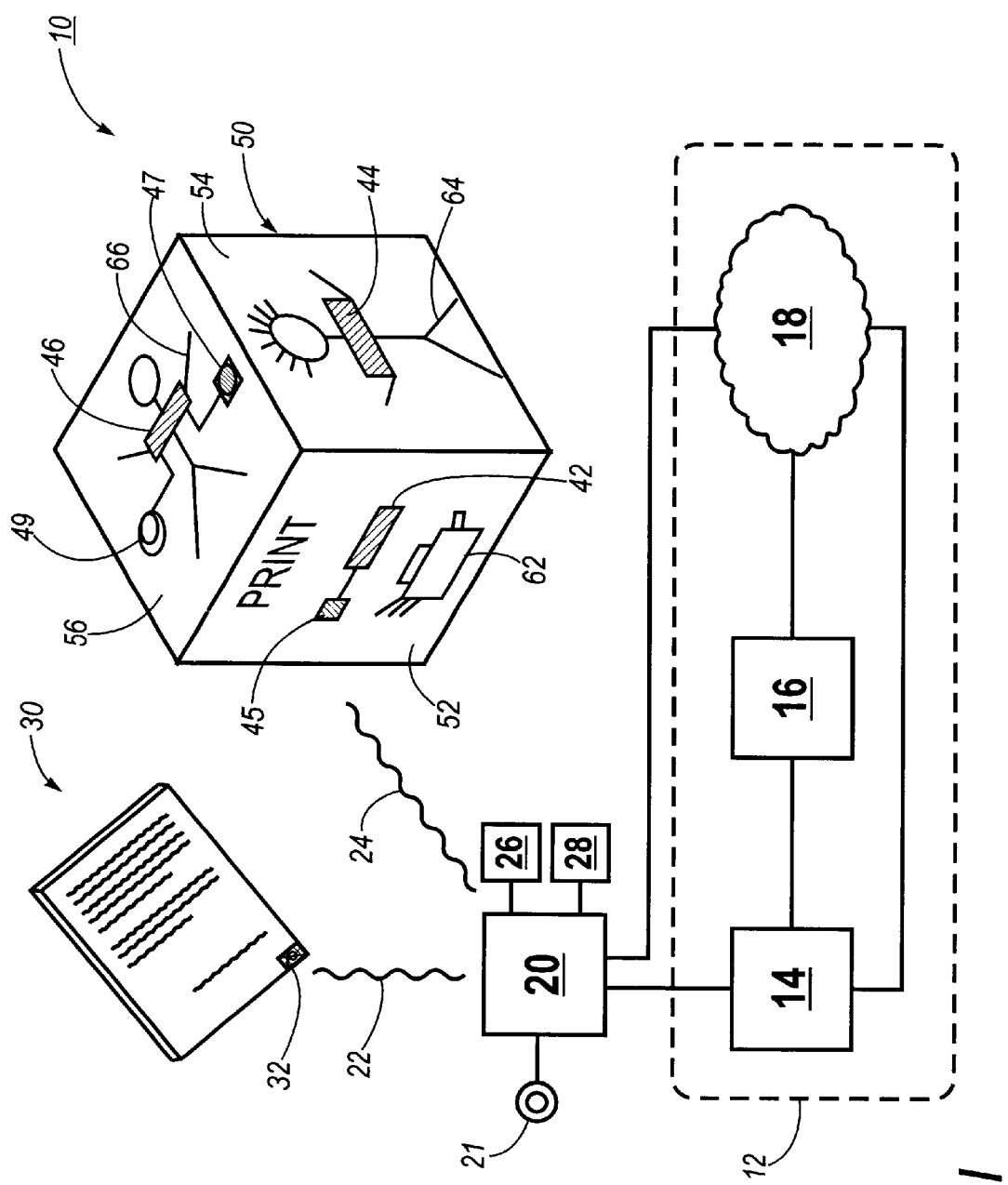
FIG. 1 is a schematic diagram of a system for identifying multiple electronic tags and providing various digital services in response to sequential presentation of electronic tags to an electronic tag reader.

FIG. 1 is a schematic diagram of a system 10 for identifying multiple electronic tags 32, 42, 44, and 46 (each tag generally having a unique electronically readable identification number) and providing various digital services in response to presentation of those electronic tags to electronic tag readers 20, 26, or 28. To access the digital services, the electronic tag reader 20 (or electronic tag reader 26 and 28) is connected to a computer system 12, which further includes a local computer 14, database servers 16, and networked computers 18. In this illustrated embodiment of the present invention, electronic tag 32 is clipped to a paper document 30, while electronic tags 42, 44, and 46 are mounted respectively on faces 52, 54, and 56 of a cube shaped polyhedron 50. Determining what digital service is invoked is aided by various textual, graphical, or symbolic indicators 62, 64, and 66 respectively located near each electronic tag 42, 44, and 46. The electronic tags 32 or 42, 44, and 46 are brought near one or more of the tag readers, query/response signals 22 and 24 are passed between the electronic tags and the tag reader, and the identification number of the read electronic tag is passed to the computer system.

As those skilled in the art will appreciate, electronic tags can be attached permanently or temporarily to various objects, including but not limited to the paper document 30, polyhedron 50, books, magazines, posters, notecards, printed advertisements, walls, floors, ceilings, furniture, electronic devices, portable computers, containers, cardboard boxes, clothing, or any other suitable object. Electronic tags can be permanently attached by embedment in objects, adhesive attachment to an object's surface, fixation by staples, or by mating to an object by any other suitable attachment mechanism. Temporary fixation of electronic tags to objects can be enabled through the use of object attachable clips, snaps, or ties (e.g. a paper clip with attached electronic tag, a rubber band or loop of string with an attached electronic tag), simple resting dispersal (e.g. throwing an electronic tag to rest upon a floor), insertion into a slot or receptacle, or any other suitable temporary attachment mechanism that advantageously eases reuse of an electronic tag by allowing successive association with various attached objects.

In FIG. 1, an object having more than one attached tag is indicated as polyhedron 50. The polyhedron 50 has multiple electronic tags 42, 44, and 46, one respectively mounted on each face 52, 54, and 56. The polyhedron 50 can be rotated to substantially present one face and its corresponding face center mounted electronic tag to the reader 20. As will be appreciated, electronic tags can be mounted anywhere on the polyhedron 50, including on its edges, on its vertices, in a random or semi random distribution, or symmetrically distributed about the polyhedron and centered on each face, as illustrated. As will be understood, use of such polyhedrons (e.g. cubes, tetrahedrons, rhombic dodecahedrons, two sided planar solids, or related shapes), in conjunction with face centered attachment, can take advantage of passive shielding of the faces to limit simultaneous readings of multiple electronic tags. Although the polyhedron 50 is indicated as a unitary solid object, various other shapes are contemplated to be within the scope of the present invention. For example, the overall shape may be similar to various rectangular prisms, or can be spheroidal, ellipsoidal, toroidal, planar, irregular, or even malleable enough to allow user definition of object shape. In addition, multiple cooperating shape elements fitted with electronic tags are contemplated, including conventional designs that permit interlocking of multiple shape elements, using ball and socket, a lock and key, slidable or rotatable interlocked components, chains, or any other linked object.

Electronic tags suitable for attachment to such foregoing objects in accordance with the present invention generally broadcast a unique identification number and optional data at various selected radiofrequencies. The identification number can be user assigned at electronic tag activation, user modifiable by software command, or fixed by an electronic tag manufacturer, depending on the particular memory system employed. In certain embodiments, infrared, ultrasonic, or other suitable data transfer systems may be used alone or in combination with radiofrequency tags to transmit unique identification numbers or associated data. The electronic tags can be inductively powered by external electromagnetic coils, powered by internal batteries, powered by photovoltaic cells, powered by trickle currents from household current when available, or any other suitable power mechanism. Broadcast of the identification number and/or data can be continuous, intermittent, in response to external status inquiries, at random intervals, or in response to local powering of the electronic tag.

The electronic tag 46 can be optionally attached to a sensor 47. Various sensor modes can supported, including absolute or relative positional information as determined by gyroscopic sensors, accelerometers, or acoustic or infrared ranging techniques. Environmental sensors, including conventional light, image, thermal, electromagnetic, vibratory, or acoustic sensors can also be present. Depending on the desired application, environmental or positional sensors such as those incorporating differential GPS positioning, image analysis or recognition, acoustic or voice identification, or differential thermal sensors can be used. Sensors may include accelerometers, compressional or tensional strain sensors, or alternatively, embedded or attached positional sensors. For certain applications, continuous sensors (e.g. bilayer sheets of capacitance sensors) may be employed. One particularly useful continuous sensor type uses multiple capacitance or resistance strips, with deformation pressure resulting in a positionally localizable analog signal proportional to the applied deformation pressure. Various sensor types can be used, including simple capacitance sensors, resistive strain sensors, analog or digital pressure switches, inductive sensors, or even fluid flow sensors. Depending on the sensor type employed, sensor data can be directly fed to the electronic tag 46 in digital form, or be transformed to digital format by an general purpose analog/digital converter that typically provides a 4 or 8 bit range (although as few as one or as many as 32 bits may be required by various applications). As will be appreciated, use of such sensor systems provides additional input information that can form part of a user interface system enabled in part by electronic tags.

In addition to sensors, various feedback displays can be attached to electronic tags 46. For example, electronic tag activation and operation may be indicated by appropriate user feedback from devices positioned either near the electronic tag 46 or near the electronic tag reader 20. For example, LED status light 49 near the electronic tag 46 and LED status light 21 near the electronic tag reader 20 can be set to provide an intermittent or steady visually perceptible light when the electronic tag is actively transmitting to the electronic tag reader 20, providing visual confirmation to a user of data transfer. Optionally, a conventional passive or active matrix liquid crystal display such as commonly used in hand holdable computers, or a display based on various electrooptical or micromechanical techniques can be used. In addition, for certain devices a non-imaging display such as may be formed by localized or distributed chromatic changes in a suitable electrochromic materials may be used to provide visual feedback to the user.

In some embodiments of the invention, visual output may be augmented (or even replaced) with a non-visual display. The non-visual display can include tactile displays based on internal actuators or auditory feedback. For example, one possible feedback display is based on internal auditory speakers (emitting a range of sounds from simple "beeps" to well formed speech, depending on available processor speed and functionality) for providing user feedback. As will be appreciated, a non-visual display and its associated actuators or electronics can support alternative feedback modes, including, for example, force feedback to a user through internal actuators, tactile based feedback (e.g. with multiple surface projections for presentation of Braille or other conventional tactile user interface), modifications to the surface texture of the device, or any other conventional mechanism for supplying status information to a user.

As will be understood, the tag reader 20 (and tag readers 26 and 28) can be constructed to detect electromagnetic, optical, or acoustic signals at various frequencies. In certain embodiments, the tag reader 20 can write as well as read electronic tag identification numbers and data. It will be understood that the particular digital service invoked in response to reading a tag can depend on which tag reader 20, 26, or 28 reads the tag, the order in which electronic tags are read by one or more of the electronic tag readers, the duration of presentation of an electronic tag to a particular reader, or any other suitable user understandable electronic tag reading protocol.

After an electronic tag is read, the computer system 12 is used to interpret the identification number of the electronic tag and provide the requested digital service. Semantic binding of the identification number can be provided by a computer 14 (which can be a desktop computer, a dedicated electronic tag processor, or a hand holdable pen computer), by networked connected database servers 16, or by other accessible networked computers 18. Computers in computer system 12 can be interconnected by various hard wired or wireless connections, and may support various communication protocols and designs, including use of a serial tethered (using, for example the RS-232C interface protocols), use of infrared signals adhering to widely utilized IRDA communication standards, or use of radiofrequency signals (which can be, for example, a cellular telephone, 900 MHz radio, or digital PCS telephonic communications). Alternative communication standards, or even alternative communication carriers such as those based on optical or acoustic techniques, can of course be employed. Other possible communication targets for computer system 12 include automation control systems, security authorization units, wireless personal digital assistants, notebook computers, or any other suitably equipped electronic system.

Binding digital services to particular electronic tags can be user defined, provided as default bindings by a system provider, learned by the system through repetition or context, or some combination of these and other suitable semantic binding techniques. For example, a database format can be constructed in which each identification number of an electronic tag is a database key. Associated with that key is a set of digital actions to undertake when that identification number of an electronic tag is detected. There is an enumerated list of such actions—display a Web page, display a text document, display a date in a calendar, go to a certain location in a document, and so forth. Each action is parameterized by a list of (name, value) pairs appropriate for that action. For example, the action to display a text document has pairs associated with it indicating the file to display, whether it should display in read-only mode, or whether the file should be converted to a particular format. By using this general (name, value) mechanism, and having the database be in human-readable ASCII form, a user can easily add new tags and new types of actions to an initially provided list. Since the database is editable, associations between identification numbers of electronic tags and digital services can be modified at any time by a user.

In addition to reading a single electronic tag and its unique identification number, the user interface of the present invention can be extended by sequentially or simultaneously reading multiple electronic tags from one or more tag readers. As those skilled in the art will appreciate, each identification number or sensed data value that is read (sensed) by the tag reader can be labeled as a "senseme", with a particular digital service or attribute being associated with each senseme. Although the wide variety of easily distinguishable sensemes (e.g. identification numbers) would alone provide a powerful user interface to a computer, the present invention further extends the flexibility of the senseme based user interface by supporting computer control based on a multiple senseme input, with temporally synchronous (or overlapping asynchronous) tuples of one or more sensemes (e.g. particular identification numbers and sensed states) being read by the tag reader. Single and multiple sensemes can in turn be extended by participation in a "sentence". A sentence is defined as a sequence of one or more temporally disjoint sensemes or senseme tuples. The sentence level allows definition of an input grammar by appropriate choice of senseme sequence, and corollary rules governing, for example, use of active verb-like sensemes or naming noun-like sensemes. For example, the verb "print" is associated with tag 42, the textual lettering "PRINT" and the symbolic icon of a printer 62 on the polyhedron 50, while the noun "http://www.test.com/DOC1.TXT", is associated with a URL to an electronic copy a document corresponding to the printed document 30. Just as in English, context can affect how sensemes are interpreted. For example, a small model of a printer with a tag on it can produce a senseme interpretable as either the verb "print" or the noun "printer" depending on its surrounding sensemes.

In effect, sensemes taken together form a sentence that can be interpreted as a command to implement a computer controlled action (i.e. digital service), whether it be to open and print a particular electronic document, unlock an electronically controlled door in response to a tag conveyed personal identification number, display a graphical image on a computer display, or begin logging on to a computer network. In operation in the system of FIG. 1, for example, the sentence "establish authorization, open a file, and print the file to printer number 3" can involve the sequential steps of reading a electronic tag 46 to establish user identification, immediately presenting an electronic tag 32 clipped to a paper document 30 to specify a related electronic document (i.e. "http://www.test.com/DOC1.TXT") and finally presenting electronic tag 42 (positioned next to the small printer symbol) just after squeezing pressure sensor 45 three times (note that sensor 45 is electrically connected to electronic tag 42 to pass small amounts of pressure response data) to initiate printing of the previously specified document at printer number "3". The foregoing operation conveniently distinguishes particular electronic documents, and allows a user to select particular printers, (i.e. with printer 1 requiring one sensed squeeze and printer 2 requiring two sensed squeezes) without requiring visual displays or complex input commands.

As will be appreciated by those skilled in the art, some temporally distinguishable sensemes (or combinations of sensemes) further represent sensemes used as a basis for a grammar in accordance with the present invention. All of the following described sensemes can be modified by numerous variations in identity of electronic tag (e.g. tag number 237654 vs. 124934), class of electronic tag (e.g. the 1000 series versus the 4000 series), presentation of sequence of particular electronic tags, repetition or timing variations in tag presentation or sequencing, as well as sensor input such as positional information, applied pressure, force utilized in squeezing a pressure sensor. In addition, timing of various objects (whether quick, slow, or alternately quick and slow) can modify interpretation of a senseme. For example, if "squeeze" is taken as a typical senseme supplied by a pressure sensor 45, one can appreciate various squeeze operations such as quick squeeze, slow squeeze, hard squeeze, soft squeeze, narrow squeeze, or wide squeeze. For purposes of the present invention, all such squeeze sensemes would be considered members of the "squeeze" class, with individual variations acting as possible modifiers to electronic tag identification number and its default semantic binding.

Figure 2:
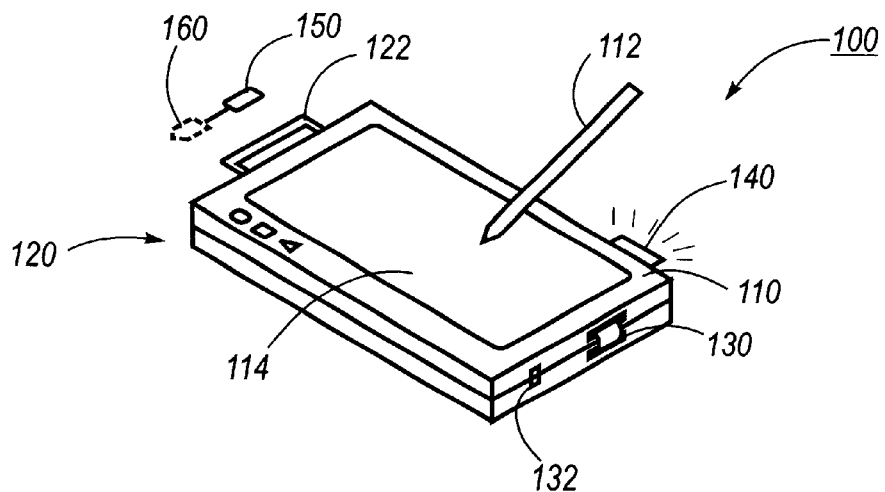
FIG. 2 is an illustration of a hand holdable computer having an attached electronic tag reader.

To better understand operation of a particular embodiment of the present invention, FIG. 2 is an illustration of a tag reading system 100 for reading an electronic tag 150 with optional connected sensor 160. The system 100 includes a hand holdable pen computer 110 with input/output aided by pen 112 and touch sensitive display surface 114, wireless infrared or radiofrequency port 140 for communication with a network (not shown), and an attached electronic tag reader 120. The tag reader 120 is powered by line 132 to pen computer 110, and serial communications with pen 110 are maintained by serial connection 130 (e.g. an RS-232C connection).

Figure 3:
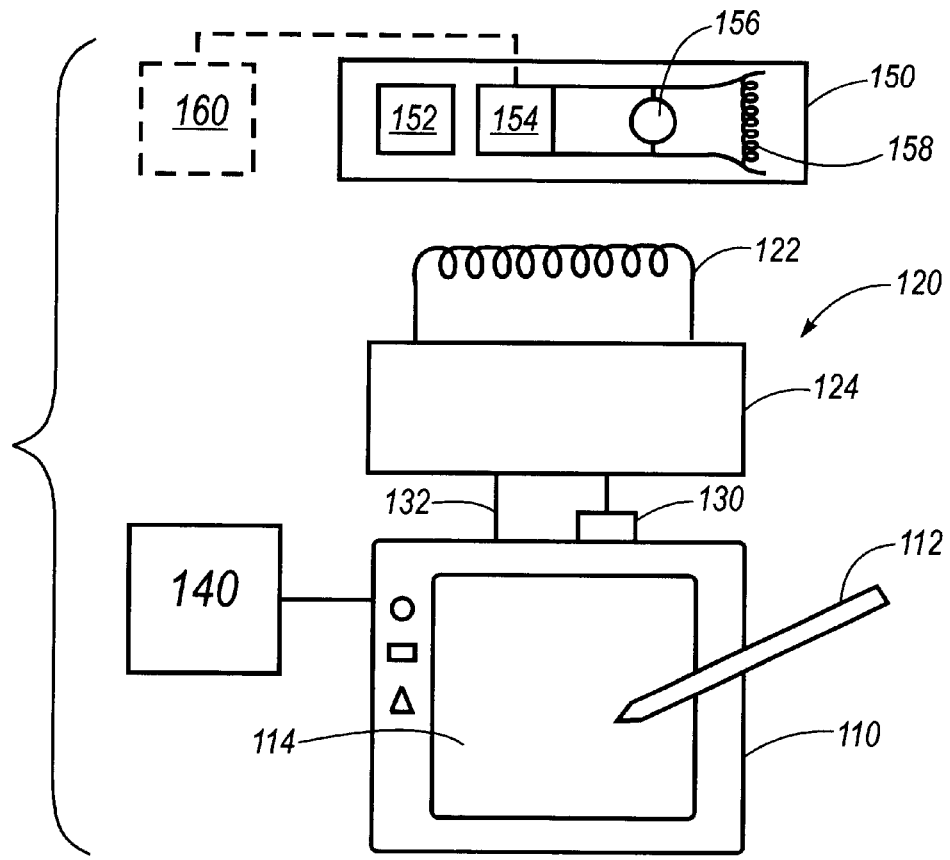
FIG. 3 is a schematic illustration showing various components of a conjoined hand holdable computer and attached electronic tag reader such as shown in FIG. 2.

FIG. 3 is a schematic illustration of the tag reading system 100 of FIG. 2. As seen in FIG. 3, the electronic tag 150 includes memory 152 for holding an identification number, other user or system defined data, and optionally any sensor data from sensor 160. A processor 154 connected to the memory 152 handles onboard logic, including optional data preprocessing, power control, and transmission/reception tasks. It will be understood that the processor 154 may include only a few logical elements, or can be a full featured microprocessor with memory 152 on the microprocessor chip. A power supply 156 (e.g. a battery, an inductive power converter, photovoltaic cells, etc.) is used to power the tag 150, and data transmissions are broadcast by antenna 158. The tag reader 120 includes tag-reader-processor/memory-buffer 120, and electromagnetic reading coil 122.

Implementation of an electronic tag reading system similar to that illustrated in conjunction with FIGS. 2 and 3 is possible using commercially available tags from Trovan, Ltd., having a website at <www.trovan.com> (hereinafter "Trovan") and tag readers suitably modified by connection of the tag reader to a hand holdable computer. A Trovan tag consists of a small coil and a tiny microchip connected to the coil, collapsing the memory 152 and processor 154 into a single logic module, and collapsing the antenna 158 and power supply 156 into a single coil that inductively powers the tag and broadcasts tag identification information. A Trovan tag has no associated optional sensor 160, and there is no on tag battery, with power being transferred to the tag from the reader 120 at each interrogation cycle. Typically a reader 120 will initiate an interrogation cycle by generating a field alternating at a frequency of 128 kHz. If it is close enough to a tag, the changing field will induce a current in the coil contained in the tag. This current can be rectified and used to charge a capacitor that after sufficient time will have enough stored charge to power its attached integrated circuit. When this condition is met, the chip will activate an oscillator at half the interrogation frequency and this signal is fed back into to the tag coil. The tag reader 120 is designed as a full duplex system—it can receive and transmit concurrently. The reader's sensitive receiver is tuned to exactly half of the interrogation frequency and is listening for a phase-modulated signal from the tag at 64 kHz. During this process the tag will modulate the response signal with a data frame containing 64 bits of information. Each frame will contain an organization or client code, a unique ID code and a checksum. For each client, $2^{39}$ tagging codes are available (approx. 550 billion).

Various sized Trovan tags can be used in the present invention. Larger tags contain a larger coil, but have similar electronics to the smaller versions. Larger tags have a greater read range. The tradeoff between tag size, reader coil size, and read range is governed by the application. The following reader and tags have been tested in system 100: LID 656 tag reader; ID 100A—cylinder tag (2.2×11.5 mm); ID 200—round tag (25.5 mm(dia),4.5 mm (thick)); ID 300—round tag (25 mm(dia), 4.8 mm (thick)); and ID 400—credit card size and shape. Reading distance typically ranges from contact to as much as 12 centimeters when an electronic tag is unshielded and fully enabled.

The tag reader 120 is designed as an embedded system that includes a simple embedded processor 124 whose task is to identify the received signal and then buffer a digital representation of it in memory. A tag reader will typically support a simple serial RS232 interface to allow a connection to be made with a general-purpose computer such as a laptop or PDA. When it has read a valid tag, a simple audible alert or flashing an LED can also be used to give a simple audio or visual indication of the tag reading process., For ease of use, a tag reader 120 can be attached to a hand holdable computer. For example, a Fujitsu 1200, (a tablet computer with a 20 cm diagonal and VGA resolution) can be mated to a Trovan 656 OEM reader. Such a tag reader can be easily concealed on the back of the tablet with power delivered by tapping into the internal power supply of the machine (line 132), with only minor modifications to the computer's housing. All of the interpretation and storage of the tag-IDs is carried out by a custom developed software system, with the Trovan reader acting to provide valid digital identification numbers of the tags across the serial interface.

The reader and the RF-tags communicate by inductive coupling between two coils. The reader coil is large relative to the tag and is responsible for providing energy to it and for reading the small radio-signal that is returned. Placement of the reading coil on the housing of a tablet computer has to be done bearing two issues in mind. First, the reading coil must be in a position that is both convenient and natural for a user interacting with tagged objects. Second, the mounting location must be chosen to minimize interference from the host computer. Suitable shielding needs to be in place to ensure a coil is given the best possible chance at reading a tag, without interfering with the pen communications. If care is not given to this part of the design, the apparent tag reading range of the system 100 can be reduced to a centimeter or less. The Trovan system can only read one tag at a time and it is important to physically control the number of tags that are in the proximity of the read coil. If two tags are readable, the tag responses will interfere and no data will be read. However, it has been found that if two tags are present but one is at least 5 mm closer to the center of the read coil, then the nearer tag will still be read successfully. Some care needs to be taken with a design that uses a minimal tag separation, as it may be hard for a user to accurately select the desired region absent tag shielding or selective disablement of tags. Also some inter-tag interference may be data dependent and may be affected by the ID of each tag.

Because positioning of the read coil is critical to the ease of use of the system 100, this problem has been examined in some detail. The exact dimensions of the read coil affects the overall inductance and the Q value. Dimensions that are optimal for one application are often not optimal for another. For example, placing a reading coil on the underside of a tablet computer, where there is lots of space to embed it, gives a designer more flexibility with the coil geometry than if it were on the front, where space is limited. To solve this problem a variety of coils could be positioned around the computer housing. The modifications allowed a user to chose between sensing locales with a manual switch, or allow for automatic coil switching. Users can switch between sensing locales electronically by sending commands through the serial port. In some cases it might be desirable to use the physical world to automatically choose the active coil. For instance, if the tablet was placed on a table, a micro-switch could detect the contact pressure and thus disable the coil at the back of the unit and switch in a more useful coil at the front. An alternative approach is to sequentially multiplex the various coils onto the reading electronics. This solution has the advantage that our tablet computer will be reading from the correct coil once in each multiplexing cycle. In certain embodiments of the present invention, the reading range of the coil can be selectively reduced or enhanced. This can be accomplished by adjustments to coil electronics, selection of different coils, use of coil shields, and selective introduction of materials that modify coil properties such as its inductance or configuration. This can be useful when operating in environments with large numbers of electronic tags, where desired reading range may be reduced, or in environments with few tags, where desired reading range may be expanded.

Network access is provided by wireless port 140 to support virtual associations (semantic bindings) which refer to external documents and/or digital services. To provide this network connection for these mobile devices, a Proxim Rangelan 2 frequency-hop spread-spectrum radio is used. A portable computer that has a free PCMCIA slot can be readily fitted with a PC-card version of the Proxim radio. This type of radio system operates at 2.4 GHz. The particular units used in system 100 are designed to provide up to 500 feet of coverage centered on each network access point. The raw bandwidth of the radio is 1.6 Mbps with a data rate of 500 kbps available to applications, taking into account the protocol overhead. An access point serves as a bridge between mobile devices equipped with a radio and an existing wired network. With only a small number of access points wireless connectivity can be provided throughout a building. In operation, use of a radio network allows most documents stored on a local file server to be viewed within a few seconds.

The software infrastructure to support this functionality includes a single thread of a multi-threaded Windows program, and can be easily written by one skilled in the art. The program, written in C++, monitors the serial port for incoming tag identification numbers. A second thread is notified of each incoming tag and displays the appropriate application and document. Some application programs are invoked as remote "black box" services via "spawn"-type commands (e.g. Netscape Navigator, audio players), while others are communicated with at a deeper and finer level via OLE (e.g., Word, Internet Explorer, Outlook). In effect, the software layer reads the incoming tag identification numbers, examines the associated tag file, which contains the mapping of identification numbers to actions, and then executes the desired command sequences to invoke selected digital services. Sometimes the same tag will be rapidly detected twice: to filter this out, a hysteresis is imposed on each tag event. If a tag identification number is detected which is not associated with any semantics, the program can either ignore the tag, or launch a dialog box querying the user for the semantics of the tag. The latter mechanism is used to update our system whenever a tag is attached to a new document. Ordinarily a shared network database (such as discussed in connection with FIG. 1) is used to map digital services to each tag identification number.

Figure 4:
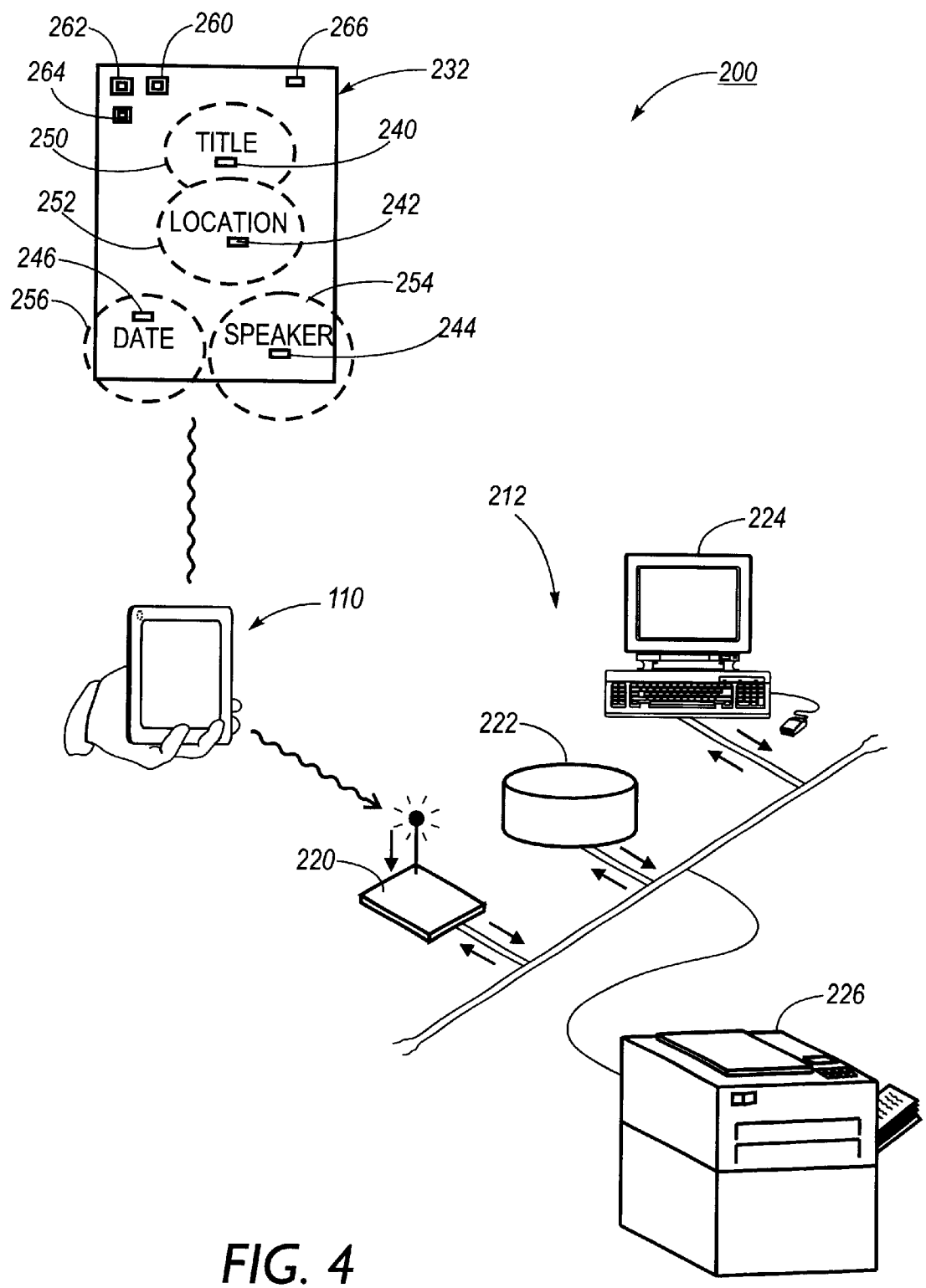
FIG. 4 is a schematic illustration of a user employing a conjoined hand holdable computer and attached electronic tag reader such as shown in FIG. 2 to access an identification number of an electronic tag affixed to a two dimensional wall mounted poster, and wirelessly transfer that information to a computer network for accessing related electronic documents.

FIG. 4 is a schematic illustration of a tag reading system 200 that allows a user employing a conjoined hand holdable computer 110 and attached electronic tag reader such as shown in FIG. 2 to access identification numbers of electronic tags affixed to a two dimensional wall mounted poster 232 or some other suitable tag enabled object. The computer 110 can wirelessly transfer that information to a transceiver 220 connected to a computer network 230 for accessing electronic documents or invoke digital services semantically bound to electronic tags. Documents can be found at a database server 222, a local desktop computer 224, and can be printed at a printer 226. In typical operation, a user would read one of the tags on the poster, transferring an identification number to the database server 222 on the network 230. The semantic binding between the identification number and the digital service is made, and, for example, a document can be printed at printer 226 or an electronic document retrieved from desktop computer 224.

For best results, the electronic tags attached to the poster 232 are separated to ensure non-overlapping read zones. For example, electronic tags 240, 242, 244, and 246 (each associated with text or symbolic indicia on poster 232) have respective non-overlapping read zones 250, 252, 254, and 256 within the dotted lines. If tags need to be set very close, shielded tags 260, 262, and 264 with electromagnetic shields provided to substantially reduce lateral detection range can be used. Alternatively, a selectively disabled tag 266 that is not powered or is otherwise disabled until manually or automatically enabled, can be used to allow for close packing of large numbers of tags without adverse data reading impact.

Figure 5:
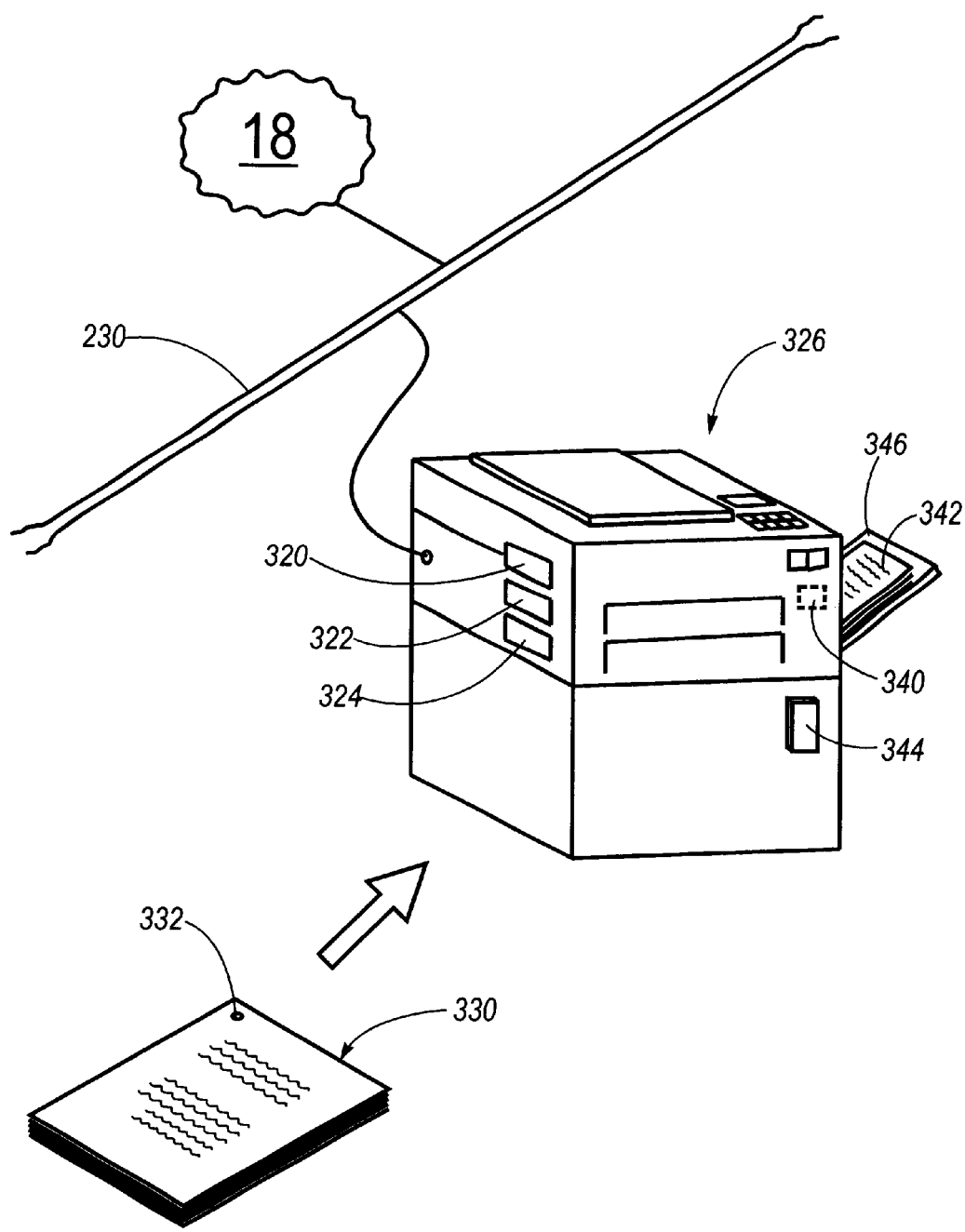
FIG. 5 illustrates a networked printer capable of printing documents identified by an electronic tag, and of associating newly printed documents with a unique electronic tag dispensed or attached by the printer.

In yet another embodiment of the present invention, FIG. 5 illustrates a networked printer 326 capable of printing documents identified by an electronic tag 332 clipped to a paper document 330. In addition, the printer 326 can associate newly printed documents 346 with a unique electronic tag 342 dispensed by dispenser 344 or attached by tag module 340 of the printer 326. Associations to the electronic tags can be made via network machines 18 contacted through network 230, using a mechanism such as previously discussed in connection with the foregoing Figures. Operation of the network printer can be controlled by provision of multiple tag readers 320, 322, and 324, each reader being attached to a particular printer operation. For example, if a user brings tag 332 to be read by tag reader 320, a color copy of the document to which the tag 332 is clipped can be generated. Reading the tag 332 from reader 322 generates a black and white copy, while reading the tag from reader 324 transfers an electronic copy of the document to a particular network machine for storage, modification, or printing. As will be appreciated, the tag 332 can be attached to a portable, hand holdable computer such as discussed in connection FIG. 2. If the tag 332 is brought near the printer 326, the printer 326 determines which computer is associated with that tag and queries the computer (by wireless connection) to determine identity of a document currently displayed on the computer screen (if any). If so, this document can be retrieved, and then be optionally printed or otherwise modified depending on user selected options.

Figure 6:
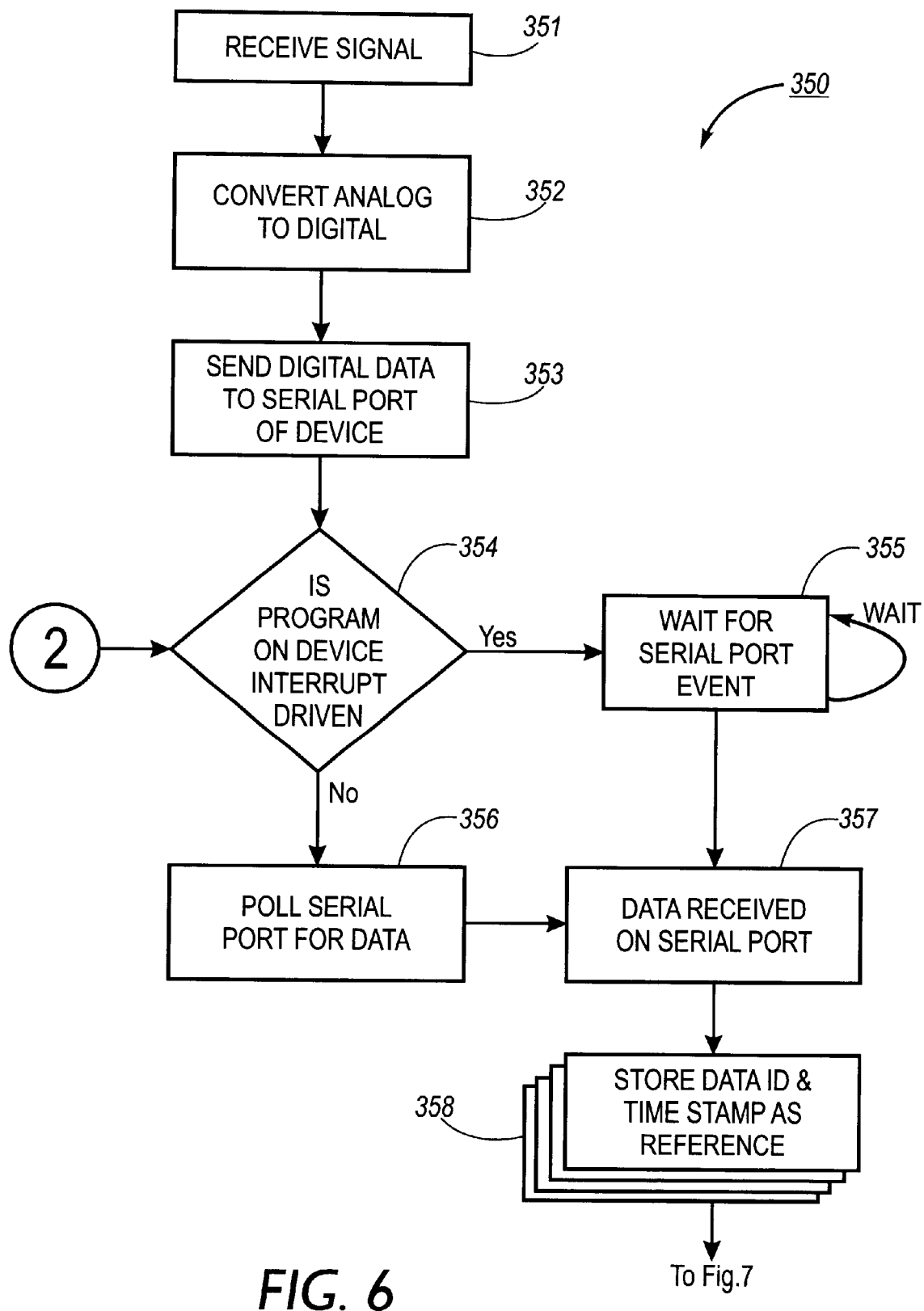
FIGS. 6 and 7 taken together are a flow chart that together illustrates various steps in interpreting signals from electronic tags and launching appropriate digital services.
Figure 7:
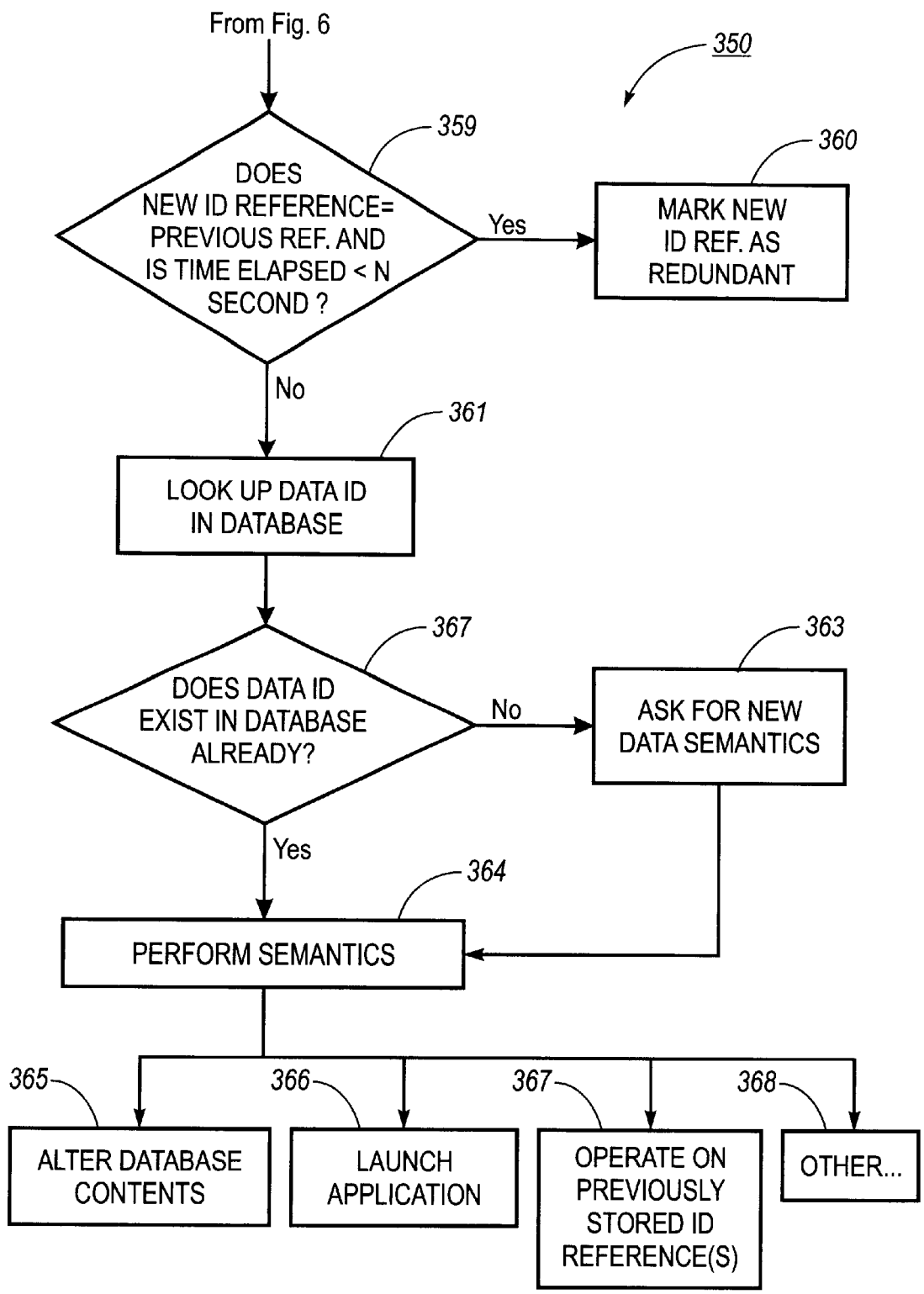

To better understand operation of one particular embodiment of the present invention, FIGS. 6 and 7 together provide a flow chart showing software logic flow as applied to a particular usage scenario. For example, consider a usage scenario in which a user has a pen computer augmented with a tag reader. In this scenario, the user will bring three tags to the attention of the reader. The first tag, located on the back of the user's corporate ID, tells the pen computer to "log in" the user and load his associated profile. The second tag, located on a binder clip on a document, tells the pen computer to display the latest electronic version of the document on its display. The third tag, located on a surface of a network printer, tells the pen computer to print the current document to the printer—the user raps the pen computer on the printer twice in quick succession, indicating a desire to print two copies. The sequence of events is as follows:

When the user brings their corporate ID with associated tag #1 within detection range of the tag reader, a first electronic signal 351 is created within the reader. This signal is then converted into digital form in step 352, e.g. an ASCII string containing the data "ID#1" (or some similar disambiguating string). This data string is then transmitted from the reader to the interpreting computer in step 353. Assuming the interpreting computer is interrupt-driven (step 354 is a "yes"), a thread of a monitoring program on the computer is waiting for this data in step 355. The thread is activated in step 357, it receives the data string "ID#1". The processor associates a time stamp with this event in step 358, and continues on to further processing. In step 359, the processor checks to ensure that this isn't a repeat of the same event, i.e. that the user's bringing of the ID card to the reader hasn't triggered multiple events. If so, the event is ignored. If not (step 359 says "NO"), processing continues. The processor consults a network database to find out what it should do when it senses this tag in step 361. In this example, the tag is already in the database (step 362 says "YES"), and so a command string indicating semantics associated with the tag is loaded into the computer, interpreted, and executed (step 364). For example, in this case, the profile associated with the user (preferred screen size, preferred font size, network passwords, etc.) is loaded into the computer, step 368.

A few seconds later, the user brings a binder clip augmented with a tag close to the tag reader and a second electronic signal 351 is created within the reader. This signal is then converted into digital form in step 352, e.g. an ASCII string containing the data "ID#2" (or some similar disambiguating string). This data string is then transmitted from the reader to the interpreting computer in step 353. Steps 354, 355, 357, 358, and 359 are performed analogously to the first tag. In step 361, the network database is consulted, with a key of "ID#2". In this example, the tag is already in the database (step 362 says "YES"), and so a command string indicating semantics associated with the tag is loaded into the computer, interpreted, and executed (step 364). In this case, step 366 is executed, a document-display application (such as Microsoft Word) is launched, and told to display the given document.

The user now brings the tag reader within range of a tag located on a network printer. A third signal 351 is created within the reader. This signal is then converted into digital form in step 352, e.g. an ASCII string containing the data "ID#3". This data string is then transmitted from the reader to the interpreting computer in step 353. Steps 354, 355, 357, 358, and 359 are performed analogously to the first tag. In step 361, the network database is consulted, with a key of "ID#3". In this example, the tag is already in the database (step 362 says "YES"), and so a command string indicating semantics associated with the tag is loaded into the computer, interpreted, and executed (step 364). In this case, step 368 is executed: the computer stores the name of the network printer, but does not yet print, since it needs to wait and see how many copies it should print.

A short time later the user again brings the tag reader within range of the network printer tag, a fourth electronic signal 351 is created within the reader. Steps 352, 353, 354, 355, 357, 358, 359, 361, and 362 are performed analogously with the third signal. In step 364, the processor determines that this is the second time in a short time period that it has seen this same tag, and so step 368 is executed: the computer associates "2" with the number of copies to print. Finally, when a specified amount of time has passed without any more data being received in serial port 357, the processor prints the document at the associated printer with the associated number of copies.

Figure 8:
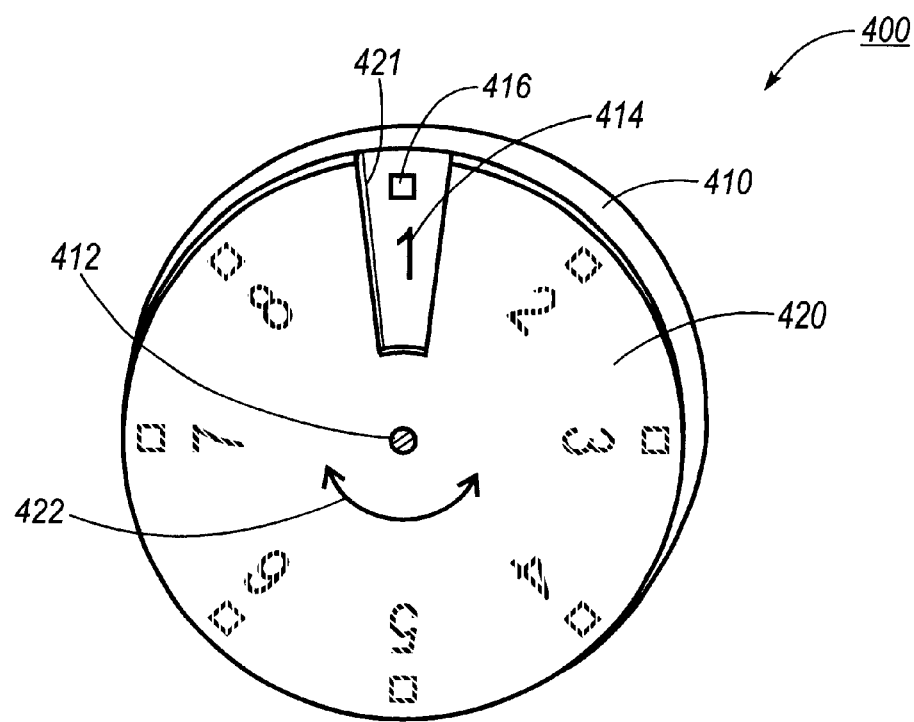
FIG. 8 is an exemplary illustration of a movable disk shaped shield rotatable relative to a disk having several attached electronic tags.

Simple modifications or augmentations of electronic tags in accordance with the present invention can enhance ease of employing multiple electronic tags in various usage scenarios. For example, FIG. 8 is an exemplary illustration of multi-tag shielding system 400 that includes a movable disk shaped shield 420 rotatable (as indicated by arrow 422) about an attachment point 412 relative to a base disk 410. The base disk 410 has multiple attached electronic tags 416 configured to radiate electromagnetic, optical (including infrared), acoustic, or other signal that is blockable or substantially reduced in signal strength by the shield 420. The shield 420 is defined to have an aperture 421 sized to expose only a single tag 416 as the shield is rotated. In operation, a user can read a number or other symbolic or textual indicia 414 printed near each tag 416 as the shield 420 is rotated. When the proper number or indicia is revealed through the aperture 421, the electronic tag is capable of radiating a signal readable by a suitable tag reader (not shown). By sequentially "dialing" a series of numbers, and presenting each number and associated tag to the tag reader (e.g. to read the number 3-5-6), a user can employ the system 400 as a low cost personal identification number that authorizes invocation of digital services while preventing unauthorized possessors of the disk from accessing various digital services. Alternatively, each tag can be associated with a particular digital service such as printing, file transfer, authorization, or identification, or any other semantic binding desired by the user.

Figure 9:
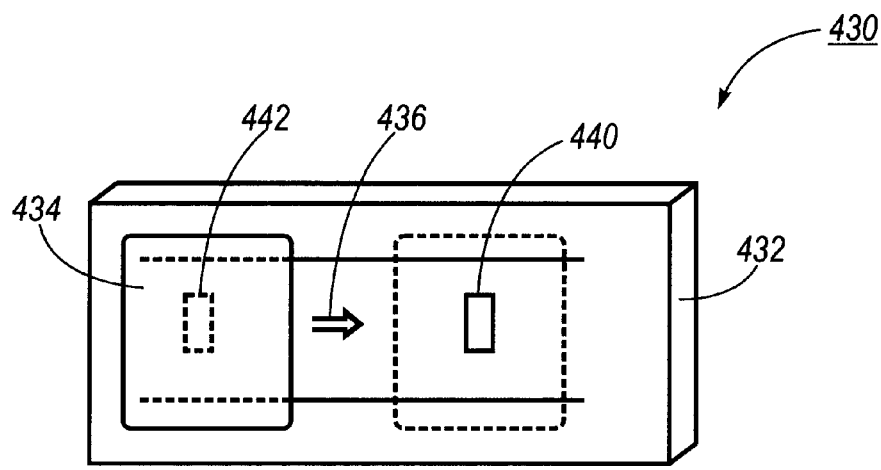
FIG. 9 is an example of a slidable shield.

FIG. 9 is yet another example of a multi-tag shield system 430 having slidable shield 434 movable (as indicated by arrow 436) relative to a base 432. The base 432 has two attached electronic tags 442 and 440 configured to radiate electromagnetic, optical (including infrared), acoustic, or other signal that is blockable, redirectable, or substantially reduced in signal strength by the shield 434. As will be appreciated by those skilled in the art, in addition to simple tag number identification, low bit rate user information can be imparted to a tag reader and associated computer system (such as discussed in connection with FIG. 1) by presenting a selected tag 440 or 442 for certain durations, or in certain user defined sequences. Presentation is accomplished by selectively sliding the shield 434 between a suitable position alternately blocking tag 440 and tag 442. Although only small amounts of information can be transmitted by this or similar methods, it can be a useful mechanism for parameterizing digital services associated with a tag, providing an equivalent of a personal identification number, or otherwise modifying tag associated digital services.

Figure 10:
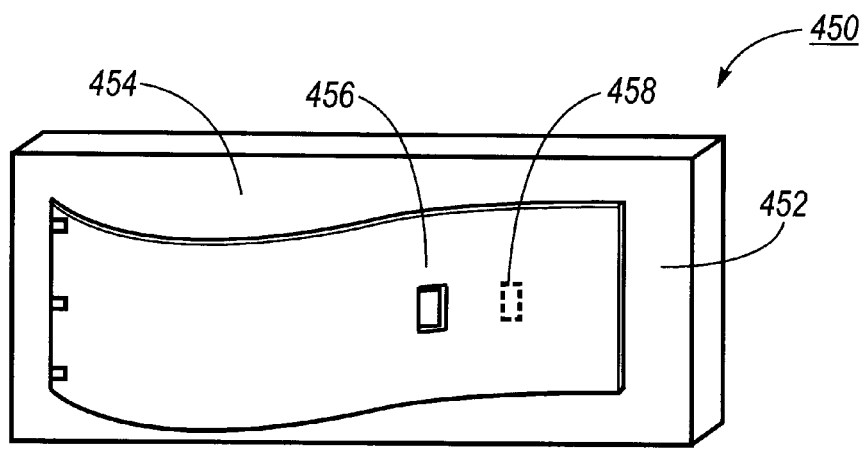
FIGS. 10, 11, and 12 are an example of a clickable shield that can be used to send low bit rate user information by selective shielding and deshielding of an electronic tag.
Figure 11:
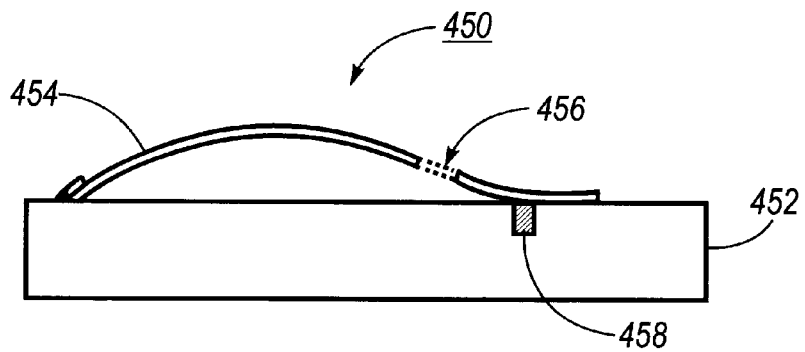
Figure 12:
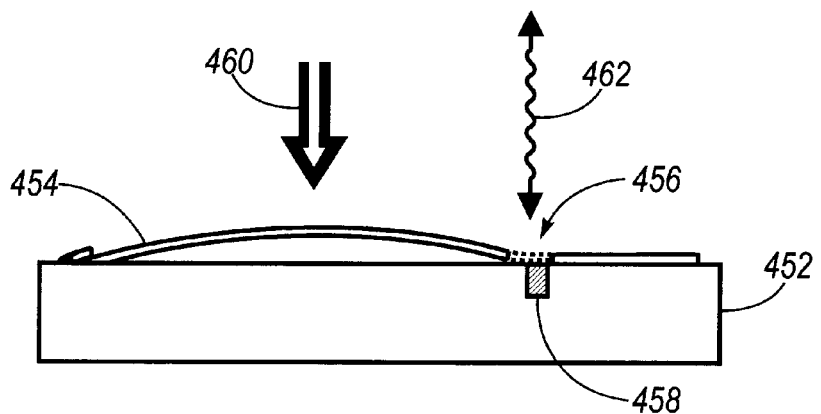

To simplify transmission of information, a mechanism 450 that facilitates user defined on-off tag reading can be employed. As illustrated in FIGS. 10, 11, and 12, a flexible shield 454 defining an aperture 456 is attached at one end to a base 452 having a partially embedded electronic tag 458. As seen in top and side view respectively in FIGS. 10 and 11, the shield 454 is normally biased to prevent radiation from tag 458 of electromagnetic, optical (including infrared), acoustic, or other signal detectable by an external tag reader such as discussed in connection with FIG. 1. However, as shown in FIG. 12, a user can depress the shield 454 toward the base 452 in the direction indicated by arrow 460, causing the aperture 456 to move transiently into position over the radiating tag 452. This transient position allows radiation of a detectable signal 462 with a signal amplitude and duration measurable by tag reader and associated computer system. Using, for example, techniques such as those based on Morse code to convey bitwise information by user controlled interruptions of a continuously radiating signal 462, mechanism 450 can used to send low bit rate user information by selective deshielding and shielding (by downwardly clicking and releasing). Such user information can be employed as discussed in connection with FIGS. 8 and 9 above.

Still another method of easing problems associated with multiple electronic tags (and also allowing user transmission of small amounts of information based on interruption to electronic tag signals) is discussed in connection with FIG. 13. This Figure schematically illustrates a selectively enabled electronic tag 540 having memory 552, processor 554, power supply 556, and signal radiator 558 (typically an antenna or light emitting diode). An optional sensor module 560 for providing sensed data to the processor can also be connected. These elements are controllably interconnected by an interconnect module 562 to allow selective enablement or disablement of the electronic tag 540. The interconnect module 562 can be activated or deactivated by a user employing a electromechanical controller 561 (such as a switch, button, relay, or other suitable mechanism). The interconnect module 562 can also be activated or deactivated by a user employing a software controller 561. The software controller 561 (which can be user controlled or under automatic control) can also be used to directly disable or enable the processor 554.

Figure 13:
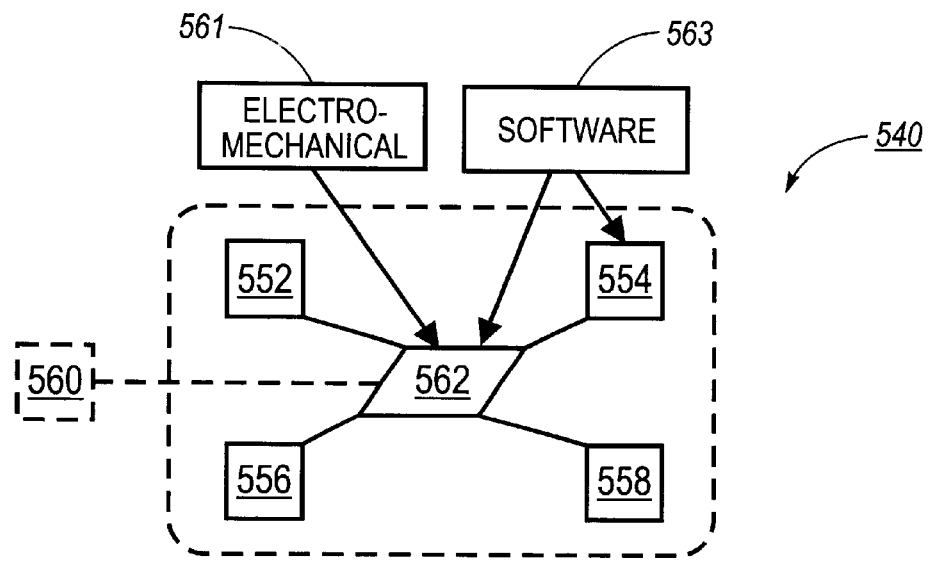
FIG. 13 is a schematic illustration of elements of an electronic tag controllably interconnected by an interconnect module to allow selective enablement or disablement of the electronic tag.
Figure 14:
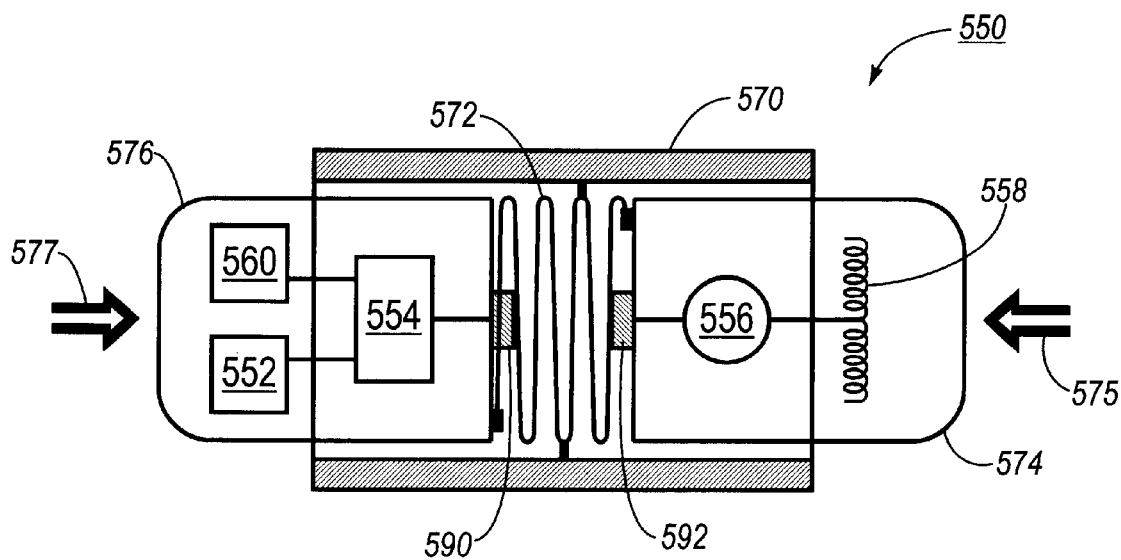
FIG. 14 is an example of a selectively enabled electronic tag, with a processor/memory unit normally biased to be separated from power converter antenna unit.

FIG. 14 is an example of a selectively enabled electronic tag 550 constructed at least partially in accordance with the schematic of FIG. 13. The electronic tag has four mechanical elements, including casing 570, a movable piece 574 held in the casing, a movable piece 576 also held in the casing, and a spring 572 connecting the movable piece 574 and the movable piece 576 to each other and the casing 570, with the spring 572 biased to oppose user exerted forces 577 and 575 that would tend to bring the mobile pieces together. The movable piece 574 is also configured to support a power supply 556 and antenna 558 for electromagnetic signal radiation. The movable piece 575 is similarly configured to support memory 552 for holding tag identification number and sensor data, a processor 554, and a sensor 560. The movable piece 574 also supports an electrical contact 592 capable of electrically contacting a similar electrical contact 590 mounted on movable piece 590. In operation, a user can enable the normally non-radiating tag by pinching together the movable pieces 574 and 575 so that the contacts 590 and 592 are brought into electrical contact. This completes a circuit that immediately causes radiation of the tag identification number. As will be appreciated, bitwise information transmission by user controlled interruptions of the radiating signal are contemplated to be within the scope of the invention.

Figure 15:
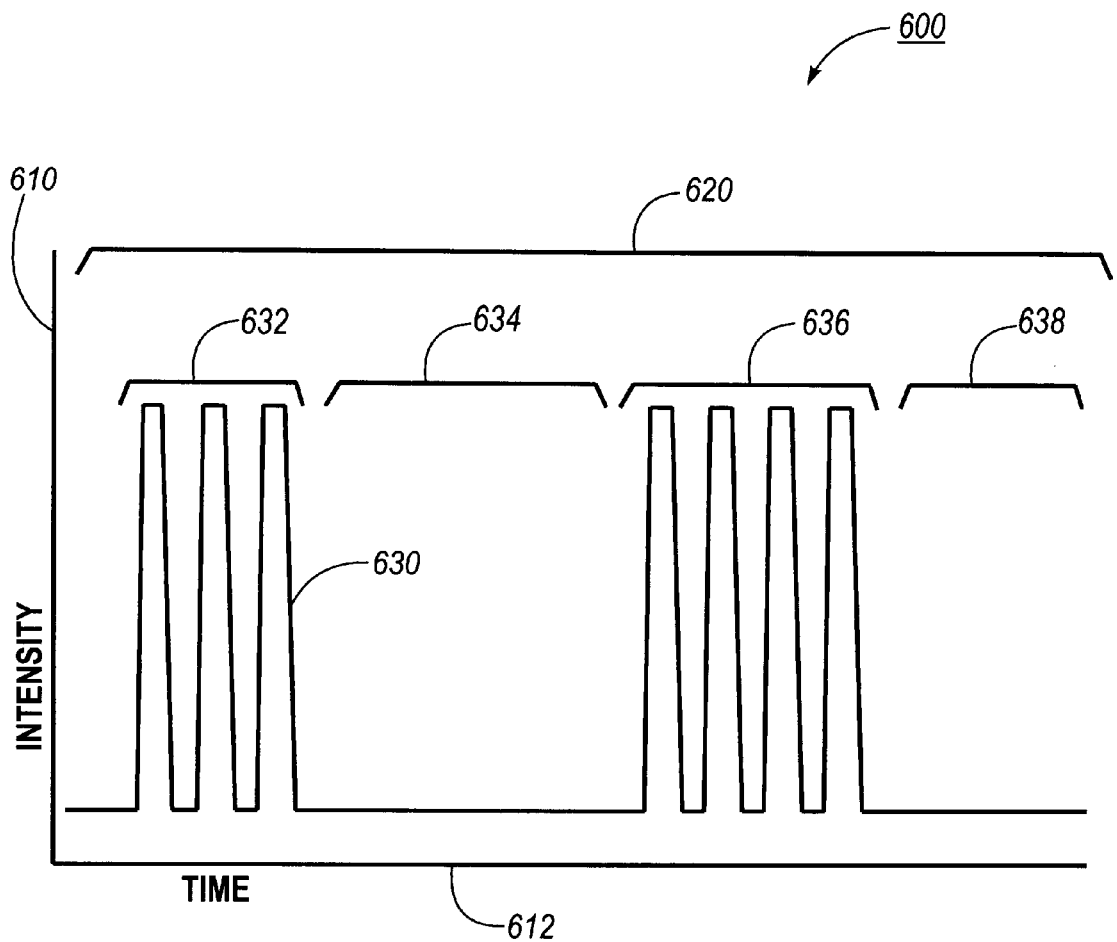
FIG. 15 is a graph schematically illustrating a user defined bit signaling time series of readable and non-readable intervals for a transmitted identification number from an electronic tag.

To better illustrate signaling methods in accordance with the present invention, FIG. 15 is a simplified graph 600 schematically illustrating a user defined bit signaling time series along an intensity axis 610 and time axis 612 of a potentially readable interval 620 for a transmitted identification number from an electronic tag. This graph 600 illustrates response of a radiating tag that regularly supplies its identification number (pulses 630 at intervals 632 and 636) when fully enabled and not shielded. When the tag is disabled or shielded, no signal is received, as illustrated by interval 634 and 638. For purposes of the present invention, intervals 632 and 636 can be interpreted as having values of "1", while intervals 634 and 638 have a value of "0". As will be understood, this series can be read as a binary "1010" over the relevant signaling time period 620. Using such techniques, a user can easily transmit small amounts of information to a suitable computer system.

As those skilled in the art will appreciate, other various modifications, extensions, and changes to the foregoing disclosed embodiments of the present invention are contemplated to be within the scope and spirit of the invention as defined in the following claims.

The claimed invention is:

1. A method for interfacing with a computer system using multiple electronic tags, the method comprising the steps of:
    a) receiving a first input from a first electronic tag,
    b) associating a first digital service from at least two digital services to be provided with the first input,
    c) receiving a second input from a second electronic tag, after receiving the first input, and
    d) associating a second digital service to be provided with the second input wherein the second digital service is dependent on the first digital service.

2. The method of claim 1 further comprising the step of providing the first and second digital services.

3. The method of claim 1 wherein the steps of determining the first and second digital services comprises retrieving from a database the first and second digital services associated with the first and second inputs respectively.

4. The method of claim 1 wherein the steps of determining the first and second digital services comprises:
    a) converting the first and second inputs to digital form, and
    b) using the digital form to consult a database to retrieve the digital service associated with each of the first and second inputs.

5. The method of claim 1 wherein at least one of the first and second digital services is user authorization.

6. The method of claim 1 wherein at least one of the first and second digital services is encryption of a determined file.

7. The method of claim 1 wherein at least on of the first and second digital services is decryption of a determined file.

8. The method of claim 1 wherein at least one of the first and second digital services is launching an executable application.

9. The method of claim 1 further comprising the step of providing the first and second digital services.

10. The method of claim 1 wherein at least one of the first and second inputs comprises a unique identification number associated with the tag.

11. The method of claim 1 wherein at least one of the first and second inputs comprises a data value.

12. The method of claim 11 wherein the data value comprises sensor input.

13. A method for interfacing with a computer system using multiple electronic tags, the method comprising the steps of:
    a) providing a first input from a first electronic tag to a tag reader in the computer system, said first input being able to be associated with one of a plurality of digital services in the computer,
    b) providing a second input from a second electronic tag to the tag reader, after providing the first input, said second input being able to be associated with a second one of a plurality of digital services in the computer system wherein said second digital service is dependent upon said first digital service, and
    c) receiving said first and second digital services from the computer system.

14. The method of claim 13 wherein at least one of the first and second inputs comprises a unique identification number associated with the tag.

15. The method of claim 13 wherein at least one of the first and second inputs comprises a data value.

16. The method of claim 15 wherein the data value comprises sensor input.

17. A modal method for interfacing with a computer system using a plurality of modal electronic tags, with each modal electronic tag configured to set the computer system into a specified mode, the method comprising the steps of:
- a) reading at least one of the plurality of modal electronic tags to set the computer system in a specified digital service mode,
- b) reading the identification number of a selected electronic tag,
- c) associating one of a plurality of digital services with the identification number of the selected electronic tag,
- d) launching a digital service based on a combination of the specified digital service mode and the associated digital service.

18. A modal method for interfacing with a computer system using a plurality of modal electronic tags, with each modal electronic tag configured to set the computer system into a specified mode, the method comprising the sequential steps of:
- a) reading an identification number of a selected electronic tag,
- b) associating one of a plurality of digital services with the identification number of the selected electronic tag,
- c) reading within a predetermined time period at least one of the plurality of modal electronic tags to set the computer system in a specified digital service mode, and
- d) launching a digital service based on a combination of the specified digital service mode and the associated digital service.

* * * * *